United States Patent
Keener

(10) Patent No.: US 7,241,328 B2
(45) Date of Patent: *Jul. 10, 2007

(54) METHOD FOR PREPARING ULTRA-FINE, SUBMICRON GRAIN TITANIUM AND TITANIUM-ALLOY ARTICLES AND ARTICLES PREPARED THEREBY

(75) Inventor: Steven Glenn Keener, Trabuco Canyon, CA (US)

(73) Assignee: The Boeing Company, Chicago, IL (US)

(*) Notice: Subject to any disclaimer, the term of this patent is extended or adjusted under 35 U.S.C. 154(b) by 294 days.

This patent is subject to a terminal disclaimer.

(21) Appl. No.: 10/707,173

(22) Filed: Nov. 25, 2003

(65) Prior Publication Data

US 2005/0109158 A1 May 26, 2005

(51) Int. Cl.
*C22F 1/18* (2006.01)

(52) U.S. Cl. .......................... 75/352; 75/354; 148/577; 148/670

(58) Field of Classification Search .................. 75/352, 75/354

See application file for complete search history.

(56) References Cited

U.S. PATENT DOCUMENTS

| | | | |
|---|---|---|---|
| 3,017,299 A * | 1/1962 | Giles et al. .................. | 148/669 |
| 3,363,846 A | 1/1968 | Eck | |
| 3,713,207 A * | 1/1973 | Ruckle et al. ........... | 228/235.1 |
| 4,659,268 A | 4/1987 | Del Mundo et al. | |
| 4,717,302 A | 1/1988 | Adams et al. | |
| 4,778,637 A | 10/1988 | Adams et al. | |
| 4,861,211 A | 8/1989 | Dunsmore | |
| 5,258,228 A * | 11/1993 | Komuro ..................... | 428/402 |
| 5,372,663 A * | 12/1994 | Shibue et al. ............... | 148/669 |
| 5,614,037 A | 3/1997 | Keener | |
| 5,775,603 A | 7/1998 | Kohler | |
| 5,858,133 A | 1/1999 | Keener | |
| 5,922,472 A | 7/1999 | Keener | |
| 5,939,146 A * | 8/1999 | Lavernia ..................... | 427/446 |
| 5,944,918 A | 8/1999 | Keener | |
| 6,171,649 B1 | 1/2001 | Keener et al. | |
| 6,221,177 B1 | 4/2001 | Keener | |

(Continued)

FOREIGN PATENT DOCUMENTS

| | | |
|---|---|---|
| EP | 0919284 | 6/1999 |
| EP | 1321199 | 6/2003 |

OTHER PUBLICATIONS

ASM Handbook, vol. 2, Properties and Selection: Nonferrous Alloys and Special-Purpose Materials, pp. 586-591 and 608-620, ASM International, 1990.*

(Continued)

*Primary Examiner*—George Wyszomierski
(74) *Attorney, Agent, or Firm*—Ostrager Chong Flaherty & Broitman PC

(57) ABSTRACT

A method for preparing ultra-fine, submicron grain titanium or titanium-alloy articles (78) used for joining or assembling of detail components. Coarse-grained titanium or titanium-alloy materials (52) are severely mechanically deformed using cryogenic milling into an ultra-fine, submicron grain powder, degassed and consolidated under controlled pressure and temperature. The resulting fasteners, articles, or components manufactured from such material have improved material performance characteristics associated with this ultra-fine, submicron grain material structure.

39 Claims, 2 Drawing Sheets

U.S. PATENT DOCUMENTS

| | | | |
|---|---|---|---|
| 6,274,200 | B1 | 8/2001 | Keener et al. |
| 6,399,215 | B1 * | 6/2002 | Zhu et al. .................... 428/544 |
| 6,403,230 | B1 | 6/2002 | Keener |
| 6,454,992 | B1 * | 9/2002 | Hebsur ........................ 419/32 |
| 6,494,972 | B1 | 12/2002 | Keener et al. |
| 6,499,926 | B2 | 12/2002 | Keener |
| 6,638,381 | B2 | 10/2003 | Keener |
| 6,902,699 | B2 * | 6/2005 | Fritzemeier et al. .......... 419/38 |
| 2004/0177723 | A1 | 9/2004 | Van Daam |

OTHER PUBLICATIONS

Bohn, R. et al; "Room temperature mechanical behavior of silicon doped TiAl alloys with grain sizes in the nano- and submicron-range"; ACTA Materialia Elsevier UK, vol. 49, No. 2, Jan. 22, 2001; pp. 299-311.

Fanta, G. et al; "Effect of ultrafine grained microstructures on the hot-workability of intermetallic/ceramic composites based on gamma—TiAl"; Intermet; Intermetallics Jan. 2001 Elsevier Science Ltd. Exeter, Engl., vol. 9, No. 1, Jan. 2001, pp. 45-49.

Jae Hoon Choi et al; "Consolidation behavior of nanocrystalline al-5AT.%Tl alloys synthesized by cryogenic milling"; Journal of Alloys and Compounds, Elsevier Sequoia, Lausanne, CH; vol. 315, No. 1/2, Feb. 9, 2001; pp. 178-186.

Bohn, R. et al., "Submicron-Grained Multiphase TiAlSi Alloys: Processing, characterization, and microstructural design" Journal of Materials Research, vol. 16, No. 6, Jun. 2001, pp. 1850-1861, XP-002348978, Materials Research Society.

* cited by examiner

METHOD FOR PREPARING ULTRA-FINE, SUBMICRON GRAIN TITANIUM AND TITANIUM-ALLOY ARTICLES AND ARTICLES PREPARED THEREBY

BACKGROUND OF INVENTION

The present invention generally relates to a method for preparing titanium and titanium-alloy articles and more specifically to a method for preparing ultra-fine, submicron grain titanium and titanium-alloy articles and articles prepared thereby.

Currently, in the fabrication of titanium and titanium-alloy articles, thermal or heat-treating processes are included in the manufacturing process. These steps are to ensure that material grain size is produced and maintained at a level that is as small as possible. As such, it is the normal practice to employ a full annealing, i.e. recrystallization, or at least stress-relieving heat treatment steps in conjunction with any cold or hot work or forming performed on the material. There have been exhaustive attempts to eliminate these thermal treatment, or heat-treating, manufacturing process steps, which can account for up to approximately 20% of the costs not to mention processing cycle time associated with producing a titanium or titanium-alloy article or fastener, such as a rivet, lockbolt or threaded pin.

The resulting grain size of formed material is critical to both its ductility and strength among other properties. In general, grain sizes larger than or equal to those identified as a number 6 (i.e., less than or equal to a number 5 as defined by ASTM E 112) are not desirable for most mechanical work or forming operations. Currently, grain sizes of formed material typically range from a grain size of 6 to 10. A duplexed grain size, defined as a significant difference in grain size depending upon location, should also be avoided. Grain size is of special importance and generally increases in the degree of importance as the material is mechanically formed or deformed to larger levels. As a rule, the finer the grain, the better the resulting formability. Recent research by Gysler et al. on "Influence of Grain Size on the Ductility of Age-Hardened Titanium Alloys" has documented the directly proportional relationship between smaller grain size and improved material properties in titanium and titanium-alloy materials. It has been shown that smaller grain size improves the strength of the material, increases ductility, and enhances the corrosion resistance.

Currently, in the fabrication of titanium and titanium-alloy articles or components, such as fasteners, additional thermal or heat treatment steps are necessary and included in the manufacturing process. These subsequent steps are intended to counteract or offset the effects on grain size resulting from of the mechanical working or forming imparted to the material during its manufacturing process.

As indicated earlier, grain size is of special importance and generally increases in the degree of importance as the material is formed in progressively higher levels of manufacturing. As a rule, the finer the grain, the better the formability and other associated characteristics. This has been known to be the case in aluminum and aluminum alloys for a long period of time and is consequently well-documented. For titanium and titanium-alloys, not as much work has been done in documenting the relationship between grain size and other material properties.

However, recent research has documented the directly proportional relationship between smaller, i.e., finer, grain size and improved material properties in titanium and titanium-alloy materials. It would therefore be desirable to provide a process for forming titanium and titanium-alloy articles having smaller grain sizes while reducing the number of processing steps.

SUMMARY OF INVENTION

The present invention utilizes severe mechanical deformation achieved preferably by cryogenic milling (or cryomilling) and consolidating to form a titanium or titanium-alloy article, thereby producing a material with a microstructure having a significantly reduced grain size as well as improved homogeneity.

It is desirable to utilize cryogenic milling technology to achieve severe mechanical deformation in the processing of titanium or titanium-alloy articles to achieve ultra-fine, submicron grain metallurgical structures without a subsequent thermal treatment or heat-treating processing step. Cryogenic milling or cryomilling is a powder metallurgy process that modifies the chemical and metallurgical structural make-up of metallic materials. When the cryomilling, i.e., cryogenic milling, process, which uses a high-energy, attritor-type ball milling device, is applied to metal-alloy powders, the metallic material's microstructure is significantly reduced through severe mechanical deformation to an extremely fine powder consistency and then is eventually re-consolidated. As has been demonstrated with aluminum and aluminum-alloy materials, the cryomilling process produces a submicron grain microstructure in the processed material.

From recent tests on aluminum and aluminum alloys, it has been determined that this resulting cryomilled, nanocrystalline material microstructure produced in such a manner has shown improved material properties, the majority of which are directly a result of the submicron grain size.

By applying the cryomilling process to titanium and titanium-alloy materials, grain size can be significantly reduced, thereby producing material with improved properties in lieu of the need for subsequent thermal treatment or heat-treatment procedures. Consequently, the overall manufacturing process for titanium and titanium-alloy components and fasteners can be shortened by using the cryomilled, submicron grain material instead of the standard, larger coarse grain size annealed material while providing nanocrystalline material with dramatically improved properties, which directly result from the significantly reduced grain size.

The fastener or component would then be produced from the "as-formed" or "F" condition directly from the cryomilled, nanocrystalline material without the need for additional, in-process thermal treatment or heat-treatment steps. This would reduce the fasteners" manufacturing costs as well as eliminate the possibility of fasteners being heat-treated improperly. Also, associated improvements in the fasteners' properties and performance can be realized as a result of the ultra-fine, submicron grain, nanocrystalline metallurgical structure produced by the cryomilling process.

Current manufacturing practices call for considerable efforts, which involve additional heat-treatment processing steps, to be taken in the processing of titanium and titanium-alloy materials in order to ensure that the resulting material grain size is maintained at a level that is as small as possible. By using cryogenically-milled material, these additional manufacturing steps, i.e., thermal or heat treatment, could be eliminated while improving upon not only the resulting material's grain size, but other associated material properties as well.

By combining the cryogenic milling, i.e., mechanical alloying of metal powders supercooled in liquid hydrogen or nitrogen, with titanium powder metallurgy, ultra-fine, submicron grain nanocrystalline materials that result may be produced in the form of extrusions and forgings. The cryomilling produces a high strength, stable ultra-fine, submicron grain size material powder. After the cryomilled powder has been re-consolidated through a HIP-ing process, the resulting nanocrystalline grain size is homogeneous and submicron. Once the cryomilled powder has been consolidated, it may be extruded or drawn into various shapes that can be used to manufacture high strength titanium and titanium-alloy components and articles, such as aerospace fasteners.

The processed nanocrystalline material is then capable of being subjected to the normal manufacturing steps associated with typical fasteners, including cold- or hot-working, but not requiring the additional subsequent thermal treatment steps. Moreover, more control of the process and alloy chemistry parameters will allow the mechanical and chemical properties, e.g., corrosion resistance, to be tailored in order to meet the requirements of high-strength fasteners better than conventional, heat-treated titanium-alloy fasteners, such as Ti-6Al-4V. A primary cause of these improved benefits is the absence of coherent precipitation hardening phases that are common in conventional thermal treatments of titanium or titanium alloys. These phases promote plastic strain localization, i.e., cracking and stress corrosion cracking.

In one aspect of the invention, a method for making an ultra-fine, submicron grain titanium or titanium-alloy article includes, providing a coarse grain titanium or titanium-alloy material having a first grain size, cryogenically milling the coarse grain titanium or titanium-alloy material into an ultra-fine, submicron grain agglomerated material in an at least partially nitrogen, carbon, hydrogen, and iron atmosphere, degassing the ultra-fine, submicron grain titanium or titanium-alloy agglomerated material, densifying or consolidating the ultra-fine, submicron grain material to form a consolidated or fully-densified ultra-fine, submicron grain high-strength and extremely homogenous material, and mechanically forming or fabricating the article from said fully-densified ultra-fine, submicron grain titanium or titanium-alloy material.

The process of the present invention advantageously generates ultra-fine, submicron grain material microstructure having significantly improved properties without the use of subsequent thermal treatment or heat-treating procedures. Consequently, the overall manufacturing process period for titanium or titanium-alloy material articles, such as fasteners, can be shortened, thereby reducing manufacturing costs and associated cycle time while eliminating or reducing the possibility of processing variabilities with the fasteners, such as those properties that result from being improperly heat-treated.

Also, associated improvements in various mechanical properties, such as ductility and fracture toughness, may be realized as a result of the resultant ultra-fine, submicron grain metallurgical structure within the article produced by the cryogenic milling process as compared with articles produced using prior or current art manufacturing processes. This could lead to substantial cost reductions depending upon the application of the articles produced using this process. For example, fasteners made according to this new process that are used in the aerospace industry could be reduced in size and still have the same level of mechanical properties. Further, these increased mechanical properties could lead to an overall reduction in the quantity of fasteners currently needed to secure, join together, or otherwise assemble detailed structural components. Both reduced quantity and size of fasteners could thus lead to further increased cost and labor savings as compared with the prior art.

DETAILED DESCRIPTION

Figure 1:
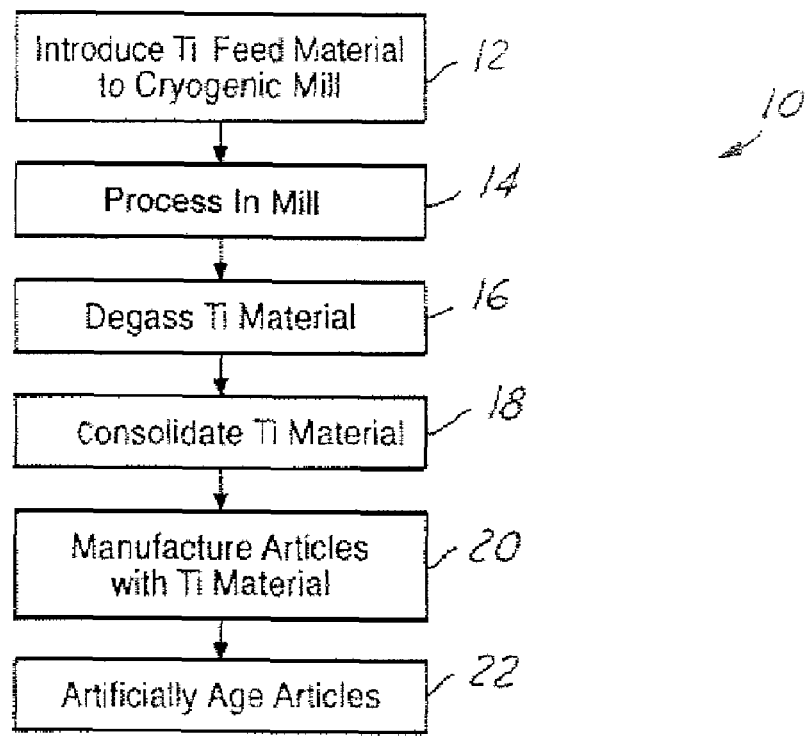
FIG. 1 is logic flow diagram for producing an ultra-fine, submicron grain titanium or titanium-alloy article from a titanium or titanium-alloy raw material powder according to a preferred embodiment of the present invention.

Referring now to FIG. 1, a logic flow diagram for producing a titanium or titanium-alloy article having an ultra-fine, submicron grain metallurgical structure is shown generally as 10. The process starts in step 12 by introducing a coarse grain titanium or titanium-alloy raw material powder into a high-energy cryogenic, attritor-type ball milling device. The titanium or titanium-alloy material powder listed above may be comprised of any titanium or titanium-alloy material as is well known in the art. Commercially pure (CP) and binary titanium alloys, such as β-Ti—Mo and α-Ti—Al, including two preferred compositions of Ti-6Al-4V and Ti-5Al-2.5Sn, are specifically addressed by this invention.

The cryogenic milling process including temperature and the introduction of other gasses is controlled. The gasses may include argon, helium, and/or nitrogen to form oxides of titanium or nitrates of titanium. The temperature is controlled using a supercooled liquid gas source such as liquid argon or liquid nitrogen. In one example, the mill is maintained at about −320° F.

In step 14, the initial, coarse grain titanium or titanium-alloy raw material powder is introduced into the mill and is processed by stirring, preferably using a medium such as stainless steel balls, within the high-energy cryogenic, attritor-type ball milling device to fully homogenize the raw feed stock material and to impart severe mechanical deformation to produce an ultra-fine, submicron grain microstructure. The initial grain size is preferably under a grain size of 6 as defined by ASTM E 112. The resulting grain size is preferably in the range of 400 to 100 nanometers, and, more preferably, between 300 and 100 nanometers. The stirring rate and length of time within the cryogenic milling device is dependent upon the type and amount of material introduced to the device, the titanium or titanium-alloy material within the device, and the size of the chamber used for mixing the titanium or titanium-alloy material. In one embodiment the speed of the attritor was approximately 100-300 RPM for roughly eight hours.

In step 16, the homogenized, agglomerated raw material powder is degassed. This may be performed in a separate device after removal from the cryogenic, attritor-type ball milling device. The degassing is an important step for eliminating gas contaminates that jeopardize the outcome of subsequent processing steps on the resulting material quality and may take place in a high vacuum, turbomolecular pumping station. In step 18, after degassing and removal from the cryogenic milling device, the powder material is consolidated to form a titanium or titanium-alloy material having an ultra-fine, submicron grain particle size. The consolidation may take the form of hot isostatic pressing (HIP). By controlling the temperature and pressure the HIP processing densifies the material. The densification process may take place in a controlled, inert atmosphere such as in a nitrogen or an argon gas atmosphere. Other processing such as a Ceracon-type, non-isostatic forging process may be used. This may allow an alternative, quasi-hydrostatic consolidation process to the HIP process step.

In step 20, the resulting titanium or titanium-alloy ultra-fine, submicron grain material is subjected to normal manufacturing steps associated with typical aerospace articles or components, such as fasteners, including but not limited to mechanical cold- or hot-working and cold- or hot-forming, but not requiring the associated thermal or heat-treatment steps. This is shown further below in FIGS. 3A-E.

One benefit of the material produced in accordance with this invention is that no subsequent thermal treatment is necessary in most applications. A subsequent thermal treatment may be performed, however, when necessary. In step 22, the formed articles or components may be artificially-aged in an oven for a pre-determined amount of time. For commercially pure (CP) titanium, the titanium is kept in the oven for approximately 12 hours at between approximately 900° F. and 950° F. The articles or components are then available for use. For the aerospace industry, these articles or components include fasteners, such as rivets, threaded pins, lockbolts, etc., and other small parts, such as shear clips and brackets, for use either on spacecraft, aircraft, or other associated airframe component assemblies.

Figure 2:
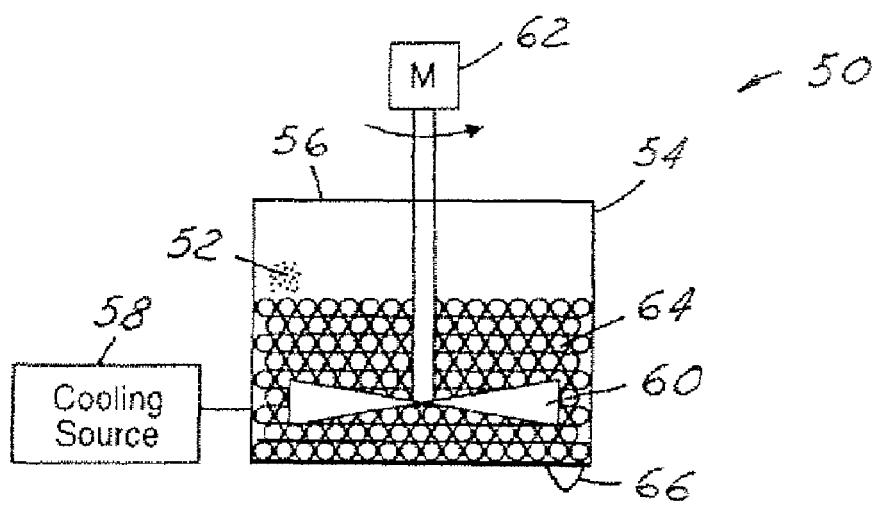
FIG. 2 is a sectional view of a high-energy cryogenic, attritor-type ball milling device used in the mechanical alloying portion, step 14, of the process delineated by FIG. 1.
Figure 3A:
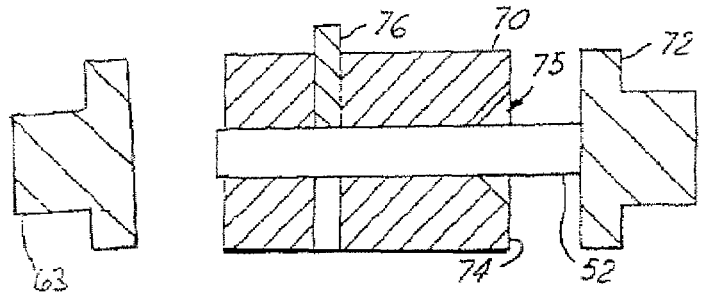
FIGS. 3A-3E are perspective views for forming a fastener by a mechanical cold-forming technique according to one preferred embodiment of the present invention from the ultra-fine, submicron grain titanium or titanium-alloy material produced in FIG. 1.
Figure 3B:
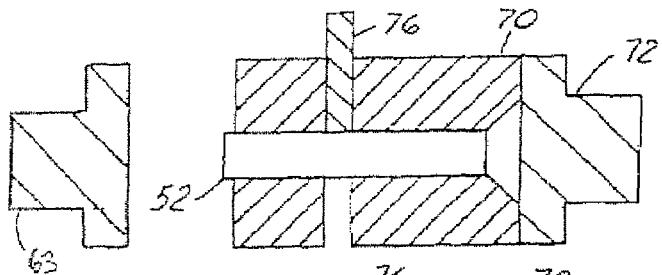
Figure 3C:
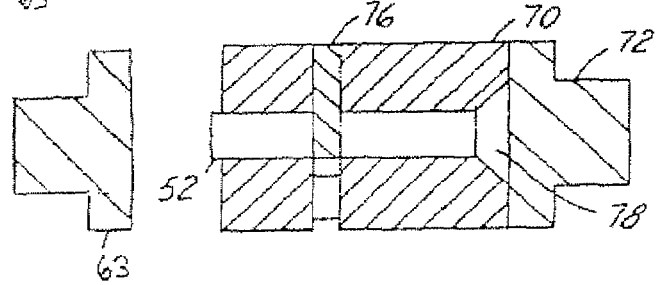
Figure 3D:
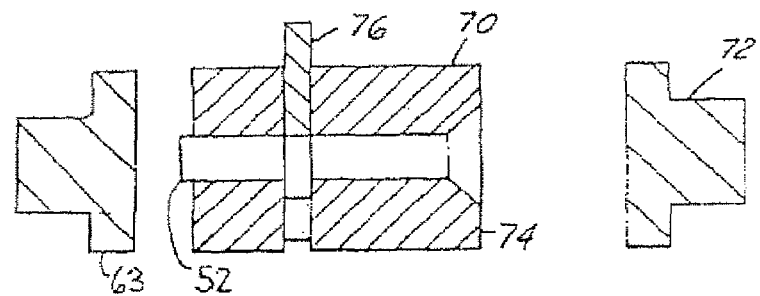
Figure 3E:
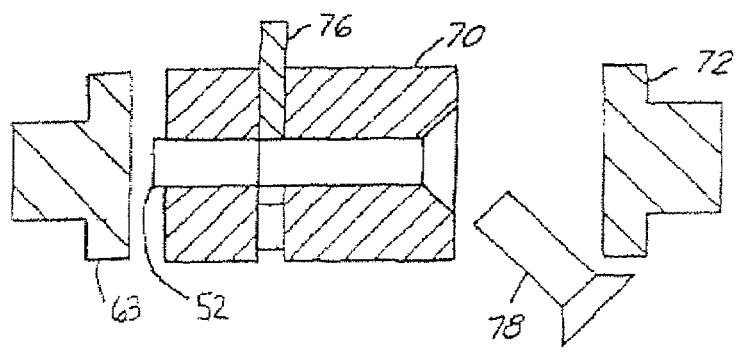

The overall process begins by introducing titanium or titanium-alloy raw material powder into a high-energy cryogenic, attritor-type ball milling device, step 12. In step 14, the powder material is subjected to severe mechanical deformation in an attritor-type, ball-milling device, such as shown in FIG. 2. Referring now to FIG. 2, a sectioned view of a high-energy attritor-type, cryogenic ball-milling device is shown generally as 50. A quantity of coarse grain, titanium or titanium-alloy powder material 52 is introduced to a stirring chamber 54 through an input 56. The titanium or titanium-alloy material 52 having an initial grain size of approximately 0.05 millimeters is preferably introduced into the cryogenic milling device in conjunction with liquid nitrogen at about a temperature of −320° F. (−196° C.) to form a slurry mixture. The temperature of the slurry mixture and the milling device is maintained by using an external cooling source 58 such as liquid nitrogen or liquid argon. Thus, the milling device and its contents are supercooled to about the temperature of the liquid nitrogen temperature and held during the milling process. Of course, other gases such as liquid helium or argon may be used in the slurry mixture inside the milling device and for cooling the device itself. Further, stearic acid (0.20% by weight) may also be introduced into the device to provide lubricity for the milling process.

Liquid nitrogen is preferred for use in the slurry mixture in the attritor-type ball-milling device. Other liquid gases such as argon or helium may also be used. Using nitrogen may provide additional strength and high temperature stabilization. Using a different liquid gas may result in a titanium alloy that does not have the benefits associated with the nitrates in the resulting microstructure.

The stirring chamber 54 has a stirring rod 60 coupled to a motor 62 or similar rotational device that controls the rotational rate. The titanium or titanium-alloy powder material 52 contacts the milling medium such as stainless steel balls 64 disposed within the chamber 54. The stirring rod or rotating impeller 60 moves the balls 64 to achieve the severe mechanical deformation needed to reduce the grain size of the titanium or titanium-alloy powder material 52 by stirring, grinding, or milling action. For typical titanium powder material, the rotational rate is approximately 100-300 revolutions per minute (RPM).

By the constant mixing and severe mechanical deformation that is achieved by the moving balls 64, the titanium or titanium-alloy powder material 52 is moved through the stirring chamber 54 to produce ultra-fine, submicron grain size. Once complete, the powder material exits through an outlet 66 or otherwise removed having a grain size that has been reduced to preferably between approximately 100 and 500 nanometers as a result of the mixing process. More preferably, the range of resulting grain size may be approximately 100-300 nanometers.

The titanium or titanium-alloy powder material is removed from the stirring chamber. The titanium powder is agglomerated into rounded agglomerates having a high-level of nitrogen in addition to carbon and hydrogen obtained from the presence of the stearic acid. Also, there is a relatively high iron content as a result of the contamination generated through contact with the steel ball medium during the cryomilling process.

Following the cryogenic milling, the material is degassed, step 16, to thoroughly clean the ultra-fine, submicron particle size powder. The degassing process occurs in a nitrogen atmosphere, at approximately +850° F. in a vacuum of approximately $10^{-5}$ Torr for about 72 hours. This is a necessary step to decrease the high hydrogen content of the milled powder.

Then, in step 18, the degassed powder material is consolidated by undergoing a HIP process at approximately +850° F. under a pressure of about 15 KSI for approximately four hours. As mentioned above, a Ceracon-type, non-isostatic forging process may be used. This may allow an alternative, quasi-hydrostatic consolidation process to the HIP process.

As described in FIGS. 3A-E below, the ultra-fine, submicron grain titanium or titanium-alloy material 52 may then be further processed by a hot- or cold-forming technique to form a fastener 78 according to one preferred embodiment of the present invention. Thus, there is no requirement of subsequent thermal treatments.

As shown in FIG. 3A-3E, the titanium or titanium-alloy ultra-fine, submicron grain material is first inserted into the die using a ram 63. The titanium or titanium-alloy material 52 is then shaped within the cold-forming die 70 by a forming or heading ram 72. The forming or heading ram 72 will reactively push against the titanium-alloy material 52 until it abuts against the outer surface 74 of the die 70, thereby completely filling the inner cavity 75 of the die 70 with the titanium or titanium-alloy material 52. Next, a shear device 76 or similar cutting device cuts the titanium or titanium-alloy material 52, thereby forming the fastener 78. The forming or heading ram 72 and the shear piece 76 then retract or withdraw to their normal positions and the formed fastener 78 is removed from the cavity 75 of the die 70. The fastener 78 may then be subsequently processed as is well known in the art to form the finished part.

Depending upon the level of hot- or cold-working performed on the titanium or titanium-alloy material 52, for example, the fastener 78 is optionally artificially-aged in an oven for a pre-determined amount of time. For commercially pure (CP) titanium, the titanium material is kept in the oven for approximately 12 hours at between approximately 900° F. and 950° F. Importantly, no further heat-treating or thermal treating step is required. The fastener 78 is then available, for example, for use in the aerospace industry or construction industry.

Of course, while FIG. 3A-3E show one possible manufacturing method for forming a fastener 78, other manufacturing techniques that are well known in the art may be used as well. For example, the fastener 78 may be made using a cold-working technique. Further, while FIGS. 3A-3E show the formation of a fastener 78, other types of fasteners, articles, or component parts may use a similar manufacturing technique. These include, but are not limited to, two-piece non-deformable shank fasteners such as threaded pins and lockbolts and one-piece deformable shank fasteners such as rivets.

The fasteners, such as rivets, made from the ultra-fine, submicron grain titanium or titanium-alloy material have improved ductility and fracture toughness over prior art titanium or titanium-alloy fasteners. Enhanced stability is also achieved at elevated temperatures due to the mechanical cold working achieved with the microstructure. These fasteners are especially useful in applications such as in the aerospace industry. Additionally, the elimination of the heat or thermal treatment step eliminates sources of error and costs associated with the thermomechanical processing step. For example, the elimination of the thermal treatment alone is believed to save approximately 20% of the cost of manufacturing a fastener used in aerospace applications. Furthermore, reduced processing time by the elimination of the thermal treatment process is achieved.

While the invention has been described in terms of preferred embodiments, it will be understood, of course, that the invention is not limited thereto since modifications may be made by those skilled in the art, particularly in light of the foregoing teachings.

The invention claimed is:

1. A method for making an ultra-fine, submicron grain titanium or titanium-alloy article comprising the steps of:
    providing a coarse grain titanium or titanium-alloy material having a first grain size;
    cryogenically milling the coarse grain titanium or titanium-alloy material into an ultra-fine, submicron grain material having a second grain size less than the first grain size;
    degassing the ultra-fine, submicron grain titanium or titanium-alloy material;
    densifying the ultra-fine, submicron grain material to form a densified ultra-fine grain material; and
    forming the article from said densified ultra-fine, submicron grain titanium or titanium-alloy material,
    wherein said cryogenically milling comprises cryogenically milling said coarse grain titanium or titanium-alloy material in a slurry with a liquid selected from liquid nitrogen, liquid argon, liquid helium, liquid nitrogen mixed with liquid argon and liquid nitrogen mixed with liquid helium, and wherein said coarse titanium or titanium alloy material is a member selected from the group consisting of Ti-6Al-4V, commercially pure titanium and Ti-5Al-2.5Sn.

2. The method of claim 1, wherein forming comprises forming without subsequent thermal processing.

3. The method of claim 1, further comprising thermal processing after forming.

4. The method of claim 1, wherein the ultra-fine, submicron second grain size material is in the nanocrystalline range.

5. The method of claim 1, wherein densifying the ultra-fine, submicron grain material to form a densified ultra-fine, submicron grain material comprises hot isostatic pressing the ultra-fine, submicron grain material to form a densified ultra-fine, submicron grain material.

6. The method of claim 1, wherein densifying the ultra-fine, submicron grain material to form a densified ultra-fine, submicron grain material comprises Ceracon-type forge consolidating the ultra-fine, submicron grain material to form a densified ultra-fine, submicron grain material.

7. The method of claim 1, wherein densifying comprises densifying the material in an at least partially nitrogen atmosphere.

8. The method of claim 1, wherein densifying comprises densifying the material in an at least partially argon atmosphere.

9. The method of claim 1, wherein forming comprises extruding.

10. The method of claim 1 wherein the cryogenically milling comprises cryogenically milling until the grain size of the material is between about 100-500 nanometers.

11. The method of claim 1 wherein the cryogenically milling comprises cryogenically milling until the grain size of the material is between about 100-300 nanometers.

12. The method of claim 1 wherein cryogenically milling is performed in an at least partially nitrogen atmosphere or at least partially argon atmosphere.

13. The method of claim 1, wherein the step of milling comprises:
    introducing said titanium or titanium-alloy material to a stirring chamber of a cryogenic milling device;
    contacting said titanium or titanium-alloy material with a milling medium for a pre-determined amount of time sufficient to impart mechanical deformation into said coarse-grained titanium or titanium-alloy material to form an ultra-fine, submicron grain structure on said titanium or titanium-alloy material; and
    removing said ultra-fine, submicron grain titanium or titanium-alloy material from said stirring chamber.

14. The method of claim 13, wherein the ultra-fine, submicron grain structure has a grain size between approximately 100 and 400 nanometers.

15. The method of claim 13 wherein the ultra-fine, submicron grain structure has a grain size between approximately 100 and 300 nanometers.

16. The method of claim 13, wherein the step of providing a coarse-grain titanium or titanium-alloy material having a first grain size comprises the step of providing a coarse-grain titanium or titanium-alloy material having a grain size of approximately 0.05 millimeters.

17. The method of claim 13, wherein the step of forming the article from said ultra-fine, submicron grain titanium or titanium-alloy material comprises the step of cold-working said ultra-fine, submicron grain titanium or titanium-alloy material.

18. The method of claim 13, further comprising cooling said titanium or titanium-alloy material to about a liquid hydrogen temperature.

19. A method as recited in claim 13, wherein the step of forming the article comprises the farther steps of: introducing the ultra-fine, submicron grain titanium or titanium-alloy material within a cavity of a mechanical forming die, said cavity having the general shape of a fastener or other fastening article or device;

cutting said ultra-fine, submicron grain titanium or titanium-alloy material;

removing said cut ultra-fine, submicron grain titanium or titanium-alloy material from said cold-forming die.

20. The method of claim 19 further comprising artificially-aging said cut ultra-fine, submicron grain titanium or titanium-alloy material.

21. The method of claim 19, wherein the step of introducing an ultra-fine, submicron grain titanium or titanium-alloy material within a cavity of a cold-forming die comprises the step of introducing an ultra-fine, submicron grain titanium or titanium-alloy material within a cavity of a cold-forming die using a ram.

22. The method of claim 19, wherein the step of cutting said ultra-fine, submicron grain titanium or titanium-alloy material comprises the step of cutting said ultra-fine, submicron grain titanium or titanium-alloy material using a shear device.

23. The method of claim 19 wherein the ultra-fine, submicron grain structure has a grain size between approximately 100 and 400 nanometers.

24. The method of claim 19 wherein the ultra-fine, submicron grain structure has a grain size between approximately 100 and 300 nanometers.

25. A method as recited in claim 13 wherein the removing comprises removing said ultra-fine, submicron grain titanium or titanium-alloy material from said stirring chamber through an outlet.

26. A method as recited in claim 1 wherein milling comprises milling with a stearic acid additive.

27. A method for making an ultra-fine, submicron grain titanium or titanium-alloy article comprising the steps of:

providing a coarse grain titanium or titanium-alloy material having a first grain size;

cryogenically milling the coarse grain titanium or titanium-alloy material into an ultra-fine, submicron grain material having a second grain size less than the first grain size;

degassing the ultra-fine, submicron grain titanium or titanium-alloy material;

densifying the ultra-fine, submicron grain material to form a densified ultra-fine grain material; and forming the article from said densified ultra-fine, submicron grain titanium or titanium-alloy material, wherein said coarse grain titanium or titanium-alloy material is composed of Ti-6Al-4V.

28. A method as recited in claim 27 wherein cryogenically milling comprises cryogenically milling said coarse grain titanium or titanium-alloy material in a slurry with a liquid selected from liquid nitrogen, liquid argon, liquid helium, liquid nitrogen mixed with liquid argon and liquid nitrogen mixed with liquid helium.

29. A method for making an ultra-fine, submicron grain titanium or titanium-alloy article comprising the steps of:

providing a coarse grain titanium or titanium-alloy material having a first grain size;

cryogenically milling the coarse grain titanium or titanium-alloy material into an ultra-fine, submicron grain material having a second grain size less than the first grain size;

degassing the ultra-fine, submicron grain titanium or titanium-alloy material;

densifying the ultra-fine, submicron grain material to form a densified ultra-fine grain material; and forming the article from said densified ultra-fine, submicron grain titanium or titanium-alloy material, wherein said coarse grain titanium or titanium-alloy material is composed of commercially pure titanium.

30. A method as recited in claim 29 wherein cryogenically milling comprises cryogenically milling said coarse grain titanium or titanium-alloy material in a slurry with a liquid selected from liquid nitrogen, liquid argon, liquid helium, liquid nitrogen mixed with liquid argon and liquid nitrogen mixed with liquid helium.

31. A method for making an ultra-fine, submicron grain titanium or titanium-alloy article comprising the steps of:

providing a coarse grain titanium or titanium-alloy material having a first grain size;

cryogenically milling the coarse grain titanium or titanium-alloy material into an ultra-fine, submicron grain material having a second grain size less than the first grain size;

degassing the ultra-fine, submicron grain titanium or titanium-alloy material;

densifying the ultra-fine, submicron grain material to form a densified ultra-fine grain material; and forming the article from said densified ultra-fine, submicron grain titanium or titanium-alloy material, wherein said coarse grain titanium or titanium-alloy material is composed of Ti-5Al-2.5Sn.

32. A method as recited in claim 31 wherein cryogenically milling comprises cryogenically milling said coarse grain titanium or titanium-alloy material in a slurry with a liquid selected from liquid nitrogen, liquid argon, liquid helium, liquid nitrogen mixed with liquid argon and liquid nitrogen mixed with liquid helium.

33. A method for making an ultra-fine, submicron grain titanium or titanium-alloy article comprising the steps of:

providing a coarse grain titanium or titanium-alloy material having a first grain size;

cryogenically milling the coarse grain titanium or titanium-alloy material into an ultra-fine grain material less than the first grain size in a supercooled mixing chamber;

degassing the ultra-fine, submicron grain titanium or titanium-alloy material;

consolidating the ultra-fine, submicron grain material to form a densified ultra-fine grain material; and forming the article from said densified ultra-fine, submicron grain titanium or titanium-alloy material, wherein said cryogenically milling comprises cryogenically milling said coarse grain titanium or titanium-alloy material in a slurry with a liquid selected from liquid nitrogen, liquid argon, liquid helium, liquid nitrogen mixed with liquid argon and liquid nitrogen mixed with liquid helium, and wherein said coarse titanium or titanium alloy material is a member selected from the group consisting of Ti-6Al-4V, commercially pure titanium and Ti-5Al-2.5Sn.

34. A method as recited in claim 33 wherein the first grain size is about 0.05 millimeters.

35. A method as recited in claim 33 wherein the ultra-fine second grain size is between 100 and 500 nanometers.

36. A method as recited in claim 33 wherein the ultra-fine grain size is between 100 and 300 nanometers.

37. A method as recited in claim 33 wherein consolidating comprises consolidating using an HIP process.

38. A method as recited in claim 33 wherein consolidating comprises consolidating using a Ceracon-type forge.

39. A method as recited in claim 33 wherein milling comprises milling with a stearic acid additive.

* * * * *